March 24, 1959 W. L. KEEHN 2,879,081
BREAKAWAY VALVE
Filed July 18, 1955 2 Sheets-Sheet 1

INVENTOR.
WARNER L. KEEHN
BY
Boyken, Mohler & Wood
ATTORNEYS

March 24, 1959  W. L. KEEHN  2,879,081
BREAKAWAY VALVE

Filed July 18, 1955  2 Sheets-Sheet 2

INVENTOR.
WARNER L. KEEHN
BY
Boyken, Mohler & Wood
ATTORNEYS

United States Patent Office 2,879,081
Patented Mar. 24, 1959

2,879,081

BREAKAWAY VALVE

Warner L. Keehn, Santa Rosa, Calif., assignor to Keehn-O Manufacturing Company, a corporation of Nevada Application July 18, 1955, Serial No. 522,666

2 Claims. (Cl. 284—10)

This invention relates to a coupling in an air line such as is employed between the tractor and trailer or between other vehicles having air brakes that are actuated by the air in a line or lines extending between the vehicles, and means for mounting such couplings.

In the trade, couplings of the type herein described are commonly known as "glad hands," and when the vehicles are connected the operator connects the coupling from the air line on the towing vehicle with the air line on the towed vehicle.

At the present time a relatively complicated and expensive installation is required in the air brake system to hold the air pressure on the towing vehicle in the event the towed vehicle should break loose and the air line between the vehicles be broken. Usually there is a very large loss of air before the air line is closed to escape of air from the towing vehicle.

Some air systems require a manual closing of the air line on the towing vehicle in the event of a break, with the result that all or most of the air in the compressed air tank on said towing vehicle may be lost before such closing, thus either making it impossible to actuate the air brakes on the towing vehicle, or greatly impairing the efficiency of such brakes. Other systems employ a complicated means whereby the air line will be closed only after a predetermined drop in pressure, and usually this drop is so great that the air brakes on the towing vehicle cannot be efficiently operated.

Heretofore the mounting of conventional couplings has been such that in the event the towing vehicle breaks loose from the towed vehicle the connecting air line breaks rather than releasing the coupling. In such instances there is a complete loss of air from the towing vehicle making it impossible to operate the brakes thereon.

One of the objects of this invention is the provision of a coupling that is economical to make, that has no precision fittings and complicated valve structure, but which coupling includes a valve that is rugged, absolutely reliable under all conditions, simple, and which valve closes instantly upon disconnecting the coupling whether accidentally or otherwise, thereby maintaining full air pressure in the air line of the towing vehicle.

Another object of this invention is the provision of means for mounting a coupling between a towing and a towed vehicle which method insures releasing of said coupling upon movement of said vehicles away from each other.

A still further object of the invention is the provision of a coupling that is provided with means enabling a flexible elastic connection between the parts thereof so as to facilitate the coupling and uncoupling of the parts and to insure an airtight fit between the parts, and to relieve the coupling of strain that would exist where there was no such flexibility.

Yet a further object of the invention is the provision of a coupling that will automatically be disconnected in the event the towed vehicle should break away from the towing vehicle.

Other objects and advantages will become apparent from the following description taken in connection with the accompanying drawings, in which.

Figure 1:
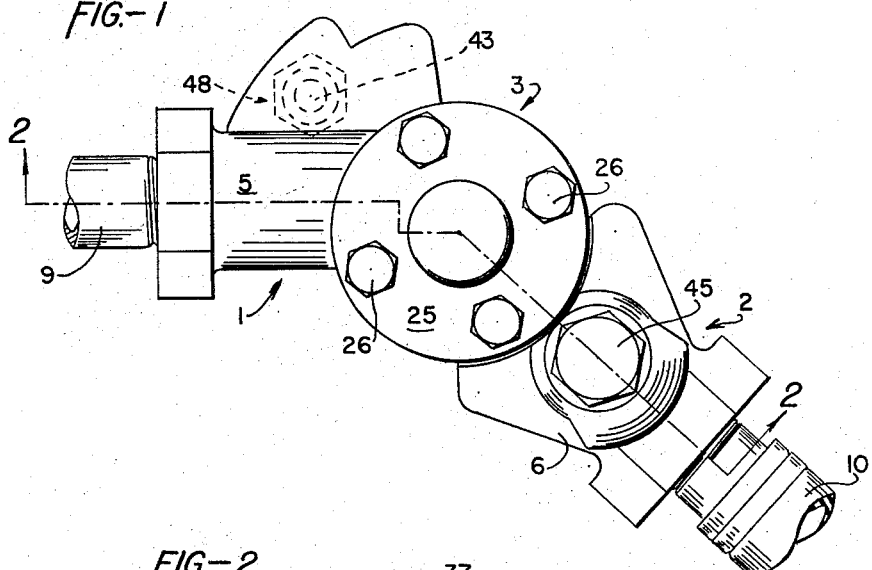
Fig. 1 is a side elevational view of the assembled coupling of this invention connected to a pair of air lines from the towing and the towed vehicles.

In detail, the coupling of this invention comprises a pair of elongated bodies generally designated 1, 2, each of which has an inner end portion that is in lapping relation to a similar inner end portion of the other body. Such inner end portion on body 1 is generally designated 3, and the end portion 4 on body 2 is lapped by portion 3.

The outer portions 5, 6 that extend away from portions 3, 4 are tubular having inner passageways 7, 8 therein (Fig. 2) that open outwardly of the outermost ends of said portions 5, 6. The axes of said passageways and portions 5, 6 are angularly disposed with respect to each other (Fig. 1).

Figure 2:
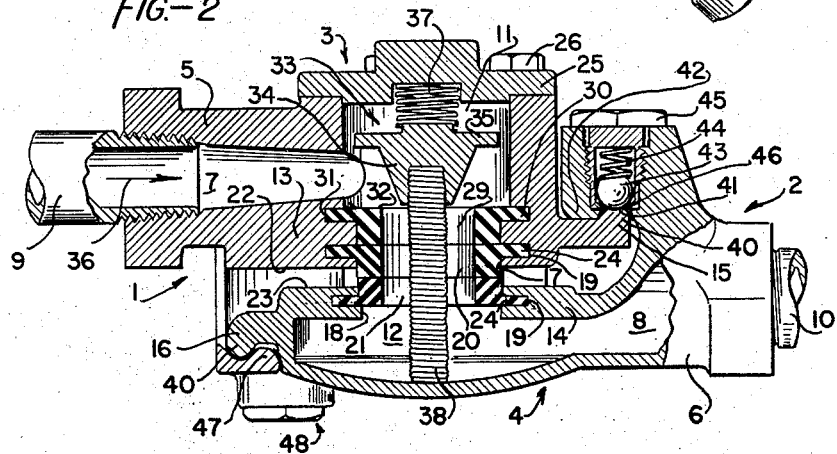
Fig. 2 is a sectional view taken generally along line 2—2 of Fig. 1.

The outer ends of outer portions 5, 6 that are remote from portions 3, 4 are threaded for connecting with air lines 9, 10 of the towing or leading vehicle, and the towed or trailing vehicle, respectively. Passageway 7 communicates with a cavity 11 in the portion 3 of body 1 that is in lapping relation to portion 4 of body 2, and passageway 8 similarly communicates with the cavity 12 in said portion 4 (Fig. 2).

The sides 13, 14 of portions 3, 4 that are adjacent to each other have similar, segmentally shaped extensions 15, 16 projecting beyond the adjacent open ends of cavities 11, 12. Each of these extensions, there being one on each portion 3, 4, constitutes one of a pair of inter-engaging means for holding bodies 1, 2 together, as will be later explained in more detail.

The adjacent opposed surfaces 22, 23 of the sides 13, 14 are preferably flat and said sides 13, 14 are formed with coaxial openings 17, 18 that respectively communicate with cavities 11, 12. The side walls of openings 17, 18 are each formed with a radially inwardly opening recess 19. Annular elastic seals 20, 21 are respectively secured within openings 17, 18 by means of a radially outwardly projecting rib 24 that extends into each recess 19. Said annular seals project outwardly of the surfaces 22, 23, and the central passageways through said seals are coaxial with openings 17, 18.

The end of cavity 11 opposite opening 18 may be closed by a cap 25 secured to portion 3 of body 1 as by screws 26. Cap 25 may be centrally apertured and threaded for connecting cavity 11 with an air line to conventional booster equipment on the towed vehicle, and a plug may close such aperture where no such line is desired.

Adjacent seal 20 a similar annular seal 29 is provided having one side in face to face engagement with seal 20. Seal 29 may be provided with a radially outwardly projecting rib 30 to be received in radially inwardly opening recess 31 in portion 3 similar to recess 19.

The central opening through seal 29 is coaxial with the openings in seals 20, 21, and the side 32 of seal 29 opposite seal 20 acts as a valve seat for a valve member 33. Said valve member is formed with a lower conical section 34 and a seating flange 35 at the large end of section 34. Said valve member is movable from an open position (Fig. 2) in which it is upwardly spaced from seal 29 to a closed position (Fig. 3) in which conical section 34 projects through the central opening of seal 29 and flange 35 seats on side 32 of said seal. In its closed position valve member 33 effectively seals the opening through seals 29, 20, 21 and prevents air flow from body 1 (in the direction of arrow 36) to body 2.

Figure 3:
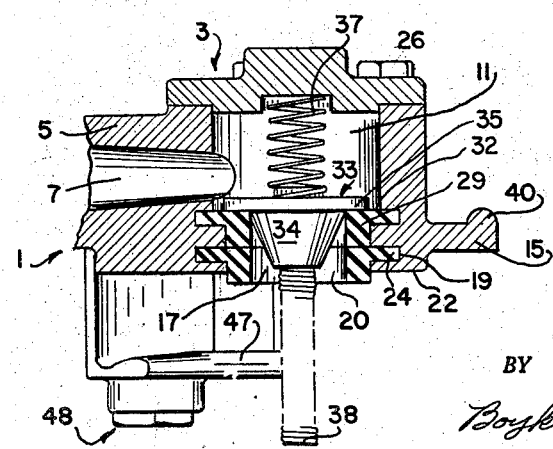
Fig. 3 is a sectional view similar to that of Fig. 2 but showing only the body of the coupling that is connected with the towing vehicle or the vehicle having the supply of air that is to be maintained.

A light helical compression spring 37 yieldably urges valve member 33 to the closed position. A tightly coiled, rigid spring 38 is provided extending downwardly from valve member 33 through the central openings in seals 29, 20, 21 and into contact with portion 4 at the bottom of cavity 12 (Fig. 2). Spring 38 is of such a length as to hold valve member 33 spaced from seat 32 when bodies 1, 2 are coupled together as shown in Fig. 2. Upon release of body 2 from body 1, spring 38 may project outwardly of opening 17 and valve member 33 is free to seal against seal 29 under the urgency of spring 37 (Fig. 3). It is obvious that spring 38 may be a rigid member projecting from either valve member 33 or portion 4 of body 2 as long as it is cooperative therebetween for urging member 33 to the open position against the resiliency of spring 37 when bodies 1 and 2 are connected.

By this structure it is seen that when bodies 1, 2 are connected there is an unrestricted flow passage from the towing vehicle through air line 9, passageway 7, cavity 11, through seals 29, 20, and 21, cavity 12, passageway 8, and into air line 10 on the towed vehicle. When bodies 1 and 2 are separated, the flow from the towing vehicle is immediately shut off by valve member 33 with no appreciable air loss through the broken connection. It will be noted that not only does seal 29 act as a seat for valve member 33, but, in combination with seal 20, prevents any leakage outwardly of portion 3 of body 1.

The segmental shaped extensions 15, 16 on end portions 3, 4 of bodies 1, 2 have been mentioned. When the axes of passageways 7, 8 are angularly disposed as shown in Fig. 1 with portions 3, 4 in lapping relation, the said extensions are at opposite sides of lapping portions 3, 4 and at opposite sides of the plane in which seals 20, 21 engage each other. The opposite outwardly facing sides of said extensions are each formed with an arcuately extending rib or track 40 (Figs. 2, 3).

Integral with body 2 is a lateral propection 42 that extends over extension 15, and this lateral projection carries a ball 43 that projects a sufficient distance out of the side of projection 42 that is adjacent extension 15 to ride on track 40. Ball 43 may be held in the projected position by helical spring 44 backed by a threaded plug 45, and a stop 46 at the side of the ball nearest extension 15 will prevent the ball from falling out of projection 42.

Each track 40 is further provided with a depression 41 (Fig. 2) into which ball 43 is adapted to be projected. Ball 43 therefore rides along track 40 until it is limited from further travel by reaching and projecting into depression 41.

Body 1 has exactly the same structure, namely; a lateral projection 47 having a projecting ball unit 48 including a ball 43 therein (Figs. 1, 2, 3). The track 40 on each extension 15, 16 is inclined oppositely at opposite sides of the axis of openings 17, 18 in portions 3, 4 but with the same inclination circumferentially of a circle concentric with said axis (Fig. 3).

In operation, when bodies 1, 2 are separated, the first step in coupling said bodies together is to position the seals 20, 21 in axial alignment with their adjacent flat sides together. This is readily accomplished by inserting spring member 38 into the opening in seal 21. Bodies 1, 2 are positioned at this point so that the axes of portions 5, 6 are substantially coaxial and with balls 43 at the low ends of tracks 40 on extensions 15, 16.

The next step is to rotate bodies 1, 2 relatively so that balls 43 will ride along the inclined tracks, and upon doing this spring member 38 will move axially so as to move valve member 33 away from its seat 32, and also to bring seals 20, 21 into airtight engagement under compression. As soon as balls 43 reach depressions 41 they will snap into the latter and will be yieldably held therein under the compression of seals 20, 21 and springs 44. The axis of portions 5, 6 will be angularly disposed with respect to each other as shown in Fig. 1 when the couple is made.

It will be noted from Fig. 1 that the projecting ball units and therefore depressions 41 are directly opposite each other in line with the axis of openings 17, 18 when the couple is completed. Seals 20, 21 not only function to provide an airtight seal between portions 3, 4 of bodies 1, 2, but they also space said portions apart allowing a slight rocking therebetween about the balls as pivots, thus equalizing any strain that might otherwise be placed on one side or the other of the seals. Also seals 20, 21 permit compression to be equalized in the event there are any irregularities in the tracks 40.

Figure 4:
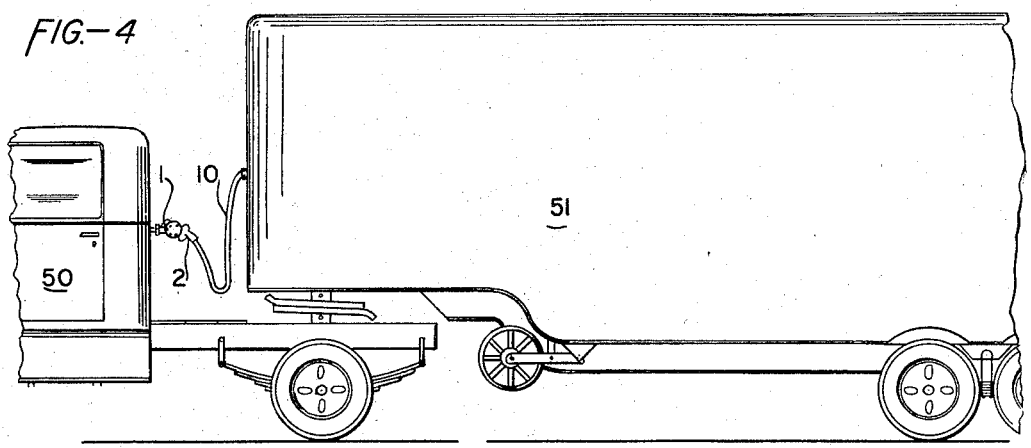
Fig. 4 is a side elevational view of a portion of a tractor and semi-trailer showing the method of connecting the coupling of this invention therebetween.

Fig. 4 shows the method of mounting the coupling of this invention between a towing vehicle or tractor 50, having an air supply, and a towed vehicle or trailer 51. It is seen that body 1 is mounted in the position of Fig. 1, or generally horizontal, and it is adapted to be rigidly secured to the rear of the cab of tractor 50. Body 2 then extends angularly downwardly from body 1 and is connected by a flexible airline 10 or the like to a point on trailer 51, spaced slightly above the intersection of the axis of portion 5 with said trailer.

Figure 5:
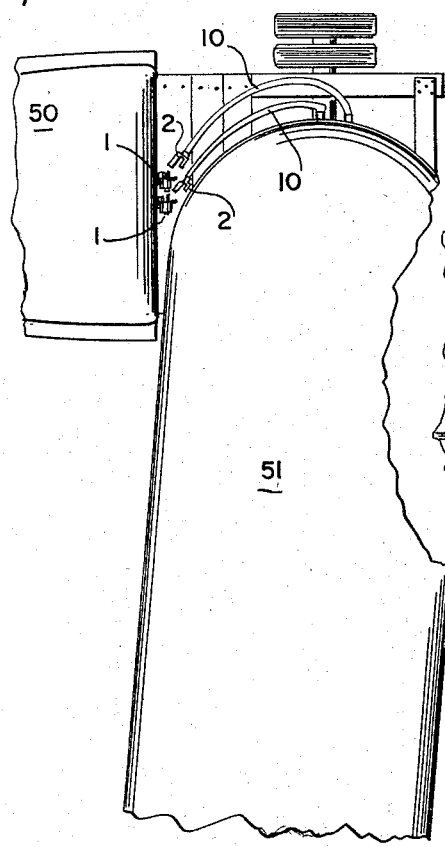
Fig. 5 is a top plan view of the tractor and trailer of Fig. 4 cramped at an acute angle to each other and showing the coupling of this invention just after release thereof; and, Fig. 6 is a side elevational view of the truck and trailer of Fig. 4 showing the trailer parting from the truck just after release of the coupling.
Figure 6:
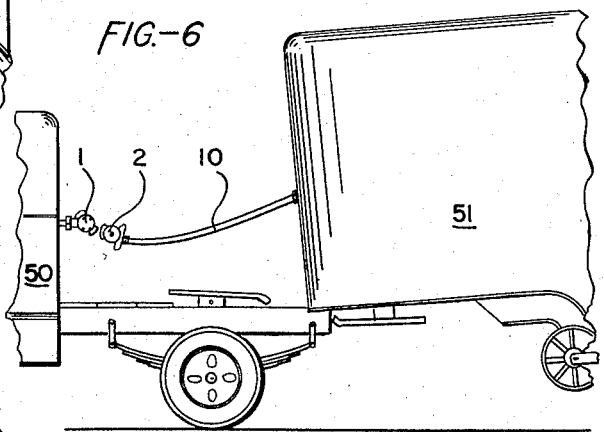

A purpose of mounting the coupling of this invention in this manner is illustrated in Figs. 5 and 6 which show two different instances in which the coupling may be broken. In the event the trailer becomes tightly cramped with respect to tractor 50 (Fig. 5), air lines 10 may become stretched to the point where they would rupture. However, if the bodies 1, 2 are mounted as described, the pull exerted by an air line 10 on body 2, because of the positioning of the connection of the air line to trailer 51, will be slightly upwardly, thereby tending to rotate body 2 with respect to body 1. This rotation will cause movement of the bodies reverse to that of the coupling procedure and body 2 will become uncoupled from body 1. This same automatic uncoupling may take place in the event air lines 10 become fouled among themselves or other parts of the tractor or trailer.

In Fig. 6 the breaking away of trailer 51 from tractor 50 is illustrated, in which case air line 10 would also become stretched to its full length. In this situation, however, air line 10 will also exert a turning moment tending to rotate body 2 to and past a coaxial disposition with respect to body 1 thereby automaticaly breaking the coupling.

By the above arrangements, in any event where air lines 10 are stretched beyond their extended length the pull on portion 6 of body 2 will result in causing a rotation of said body with respect to body 1 opposite to that required to connect them, and the couplings will be automatically broken. When this occurs, valve member 33 will instantly close the flow of air therethrough, and there will be no appreciable escape of air from the tank on the towing vehicle or tractor 50.

Although the invention has been described and illustrated in detail, such is not to be taken as restrictive thereof since it is obvious that modifications could be made therein without departing from the spirit and scope of the invention.

I claim:
1. A coupling for connecting the air lines of a towing and a towed vehicle comprising: a pair of elongated bodies having one of their ends in lapping relation, a passageway for air extending from within the lapping end of each body to its opposite end and opening outwardly of the latter for connections with one end of said air lines, respectively, coaxial openings formed in the adjacent sides of the lapping ends of said bodies communicating with said passageways, a valve member carried in one body of said pair movable between an open position in which said one opening in said one body is open to flow of air therethrough and a closed position closing said one opening to said flow, means for yieldably urging said valve member to said closed position, a tightly coiled spring member projecting from said valve member through said one opening and engageable by the other body for holding said valve member in said open position when said lapping ends are secured together, an elastic seal between said bodies around said openings, and means for releasably securing said lapping ends together with said seal under compression.

2. For use with a towing and a towed vehicle provided with a braking system that includes an air pressure line on said towing vehicle and a flexible air receiving line on said towed vehicle, a coupling comprising: a pair of elongated bodies each having connecting passageways for air extending therethrough longitudinally thereof with said bodies in laterally lapping relation at one of their ends, the inner ends of said passageways at said lapping ends opening laterally outwardly of said bodies toward each other with said open ends coaxial on an axis that is substantially perpendicular to the longitudinal axis of said bodies, interengaging means on said bodies at said lapping ends for connecting said bodies upon rotation of the latter relatively in one direction about the axis of said open inner ends of said passageways and which interengaging means are disconnectable upon their relative rotation about said axis in a reverse direction, means for rigidly supporting one body of said pair on said towing vehicle and for connecting the outer end of said passageway in said one body with said air pressure line, means for connecting the outer end of the passageway in the other body of said pair with said air receiving line, the longitudinal axis of said other body extending angularly relative to horizontal and to the longitudinal axis of said one body when said bodies are connected and the outer end of said other body being rotatable toward horizontal for disconnecting said bodies whereby a horizontally directed pulling tension on said outer end of said other body will cause said outer end to swing toward horizontal for disconnecting said bodies, and valve means within the passageway in said one body movable from a position closing said passageway to flow of air therethrough with said bodies so connected to a position opening said passageway to said flow with said bodies so disconnected and vice versa.

References Cited in the file of this patent

UNITED STATES PATENTS

| | | |
|---|---|---|
| 541,714 | Bottomly et al. | June 25, 1895 |
| 747,733 | Lafferty | Dec. 22, 1903 |
| 1,013,418 | Michaelson | Jan. 2, 1912 |
| 1,973,610 | Connors | Sept. 11, 1934 |
| 2,084,842 | Fraser | June 22, 1937 |
| 2,199,143 | Stohlberg | Apr. 30, 1940 |
| 2,330,413 | Eaton | Sept. 28, 1943 |
| 2,335,825 | Eaton | Nov. 30, 1943 |
| 2,641,272 | Seale | June 9, 1953 |
| 2,699,961 | Omon et al. | Jan. 18, 1955 |
| 2,742,975 | Holland | Apr. 24, 1956 |